United States Patent [19]

Anstötz et al.

[11] Patent Number: 5,691,744

[45] Date of Patent: Nov. 25, 1997

[54] PROCESSOR SYSTEM COMPRISING A PROCESSOR AND A MEMORY FIELD FOR CONTAINING A COMPUTER INTERFACE

[75] Inventors: Karin Helene Marie Anstötz, Cologne, Germany; Karel Gerard Coolegem, The Hague, Netherlands

[73] Assignee: Koninklijke PTT Nederland N.V., Netherlands

[21] Appl. No.: 634,370

[22] Filed: Apr. 18, 1996

Related U.S. Application Data

[63] Continuation of Ser. No. 269,047, Jun. 29, 1994, abandoned.

[30] Foreign Application Priority Data

Jul. 8, 1993 [EP] European Pat. Off. ............ 93202012

[51] Int. Cl.$^6$ .................................................. G09G 5/08
[52] U.S. Cl. ...................... 345/146; 395/333; 395/337
[58] Field of Search ............................ 345/115, 116, 345/146, 163, 169, 173, 902; 395/326, 333, 334, 335, 337, 338, 343, 344, 345, 352, 354, 682; 370/465; 380/4

[56] References Cited

U.S. PATENT DOCUMENTS

| | | | |
|---|---|---|---|
| 4,947,346 | 8/1990 | Kamiya | 364/521 |
| 5,014,045 | 5/1991 | Shimura et al. | 345/146 |
| 5,038,401 | 8/1991 | Inotsume | 345/169 |
| 5,204,947 | 4/1993 | Berstein et al. | 345/4 |
| 5,280,275 | 1/1994 | Kaplan | 345/157 |
| 5,396,264 | 3/1995 | Falcone et al. | 345/146 |

FOREIGN PATENT DOCUMENTS

| | | |
|---|---|---|
| 0464306 | 1/1992 | European Pat. Off. . |
| 0523661 | 1/1993 | European Pat. Off. . |

OTHER PUBLICATIONS

Microsoft Windows User's Guide version 3.0.
Microsoft Windows 3.1, Catapult, p. 19, 1992.
Bier, E.A. et al., "MMM: A User Interface Architecture for Shared Editors on a Single Screen", *Proceedings of the Fourth Annual Symposium on User Interface Software and Technology*, Nov. 11–13, 1991, Hilton Head, South Carolina, pp. 79–85.

*Primary Examiner*—Steven Saras
*Attorney, Agent, or Firm*—Michaelson & Wallace; Peter L. Michaelson; John T. Peoples

[57] ABSTRACT

Known processor systems comprising a processor and memory fields for containing computer interface profiles each having a number of elements each representing a function are static systems. The processor system according to the invention is a dynamic system, by allocating an element parameter to an element, which element parameter is a function of the number of times this element has been activated, for example per time interval, and by comparing this element parameter with a predefined value. In dependence of the comparison result, the element is displayed directly or indirectly.

8 Claims, 5 Drawing Sheets

FIG. 2

PROCESSOR SYSTEM COMPRISING A PROCESSOR AND A MEMORY FIELD FOR CONTAINING A COMPUTER INTERFACE

CROSS REFERENCE TO RELATED APPLICATION

This application is a continuation of patent application Ser. No. entitled "Processorsystem Comprising a Processor and a Memory Field for Containing a Computer Interface", Ser. No. 08/269,047, filed on Jun. 29, 1994 now abandoned.

A BACKGROUND OF THE INVENTION

The invention relates to a processor system comprising a processor and a memory field for containing a computer interface having a number of elements each representing a function, the processor system being adapted for displaying at least one element directly on a screen.

Such processor systems are of common general knowledge, for example a Personal Computer (PC) or a workstation. The computer interface has a number of elements each representing a function, for example an icon (function: for example file transfer), a menubar (function: for example menu item choise), a window (function: for example editing of text or sharing computer application data), a video window (function: for example display of image) or a number of required video windows (function: for example required number of images to be displayed simultaneously). The processor system is adapted for displaying one or more elements directly on a screen, like four icons, one menubar including menu-items and two video windows, and for displaying other elements selectively or indirectly on the screen, like two other icons and a pull-down-menu-item (these can be displayed for example by selecting a menu-item on the displayed menubar). Other elements are never displayed on the screen, like the number of required video windows.

These known processor systems are static systems, which is disadvantageous.

B SUMMARY OF THE INVENTION

It is an object of the invention, inter alia, to provide a dynamic processor system as defined by the preamble.

Thereto, the processor system according to the invention is characterized in that the processor system is adapted for allocating an element parameter to an element, the element parameter being a function of a number of times that this element has been activated, and comparing this element parameter with a predefined value and in dependence of a comparison result directly or indirectly displaying this element on the screen, the memory field being an adaptable memory field and the computer interface being an adaptable computer interface.

By allocating an element parameter to an element, which element parameter is a function of a number of times that this element has been activated, for example the number of times per time interval that this element has been activated, this element parameter can be compared with a predefined value. In dependence of this comparison result the element is displayed directly or indirectly. For example each time an application to which the computer interface belongs is switched on, the processor system can decide at the hand of several comparison results which elements are displayed directly and which are displayed indirectly.

This invention is based on an insight that all present processor systems comprising a processor and a memory field for containing a computer interface are static ones, and that the number of times, for example per time interval, that an element has been activated should determine whether this element is displayed directly or indirectly.

A first embodiment of this invention is characterized in that the processor system comprises a first further memory field for containing a first further computer interface having a first further number of elements each representing a function and a second further memory field for containing a second further computer interface having a second further number of elements each representing a function, the processor system being adapted for selecting a further memory field.

According to this embodiment a further memory field for containing a further computer interface can be selected to present a user a limited number of possible computer interfaces. For example, the computer interface showing most resemblance to the adaptable computer interface with respect to one or more elements and their element parameters is selected.

A second embodiment of this invention is characterized in that the processor system is adapted for allocating an element code to an element of the adaptable computer interface, the element code representing this element being enabled or disabled, and in dependence of the element code displaying or not displaying this element on the screen.

According to the second embodiment an enabled element is displayed directly or indirectly, while a disabled element is not displayed at all or displayed in an other way showing the disablement.

A third embodiment of this invention is characterized in that the processor system is adapted for storing a new value of the element parameter.

By storing a new value of the element parameter the processor system, after the application to which the computer interface belongs being switched off and switched on by the same user, does not have to adapt itself all over again, but can start from the latest status of the computer interface.

A fourth embodiment of this invention is characterized in that the predefined value comprises a previous value of the element parameter.

In this case the predefined value will comprise the previous value of the element parameter to detect an increase or a decrease of the number of activations of this element.

A fifth embodiment of this invention is characterized in that the predefined value comprises an other element parameter of an other element.

In this case the predefined value will comprise the other element parameter to determine a subset of most frequently activated elements. For example this predefined value is a threshold value calculated from the comparison between all element parameters.

A sixth embodiment of this invention is characterized in that the predefined value comprises a previous value of the predefined value.

In this case an exceptional value of the predefined value is smoothened by taking the average of some predefined values.

Of course, two or more of the mentioned embodiments can be combined in all possible ways.

C EMBODIMENT OF THE INVENTION

The invention will be explained in detail at the hand of embodiments shown in the figures:

FIG. 2 shows a representation of the four memory fields each one of them comprising an element code and element parameters belonging to an element of a computer interface.

Figure 1:
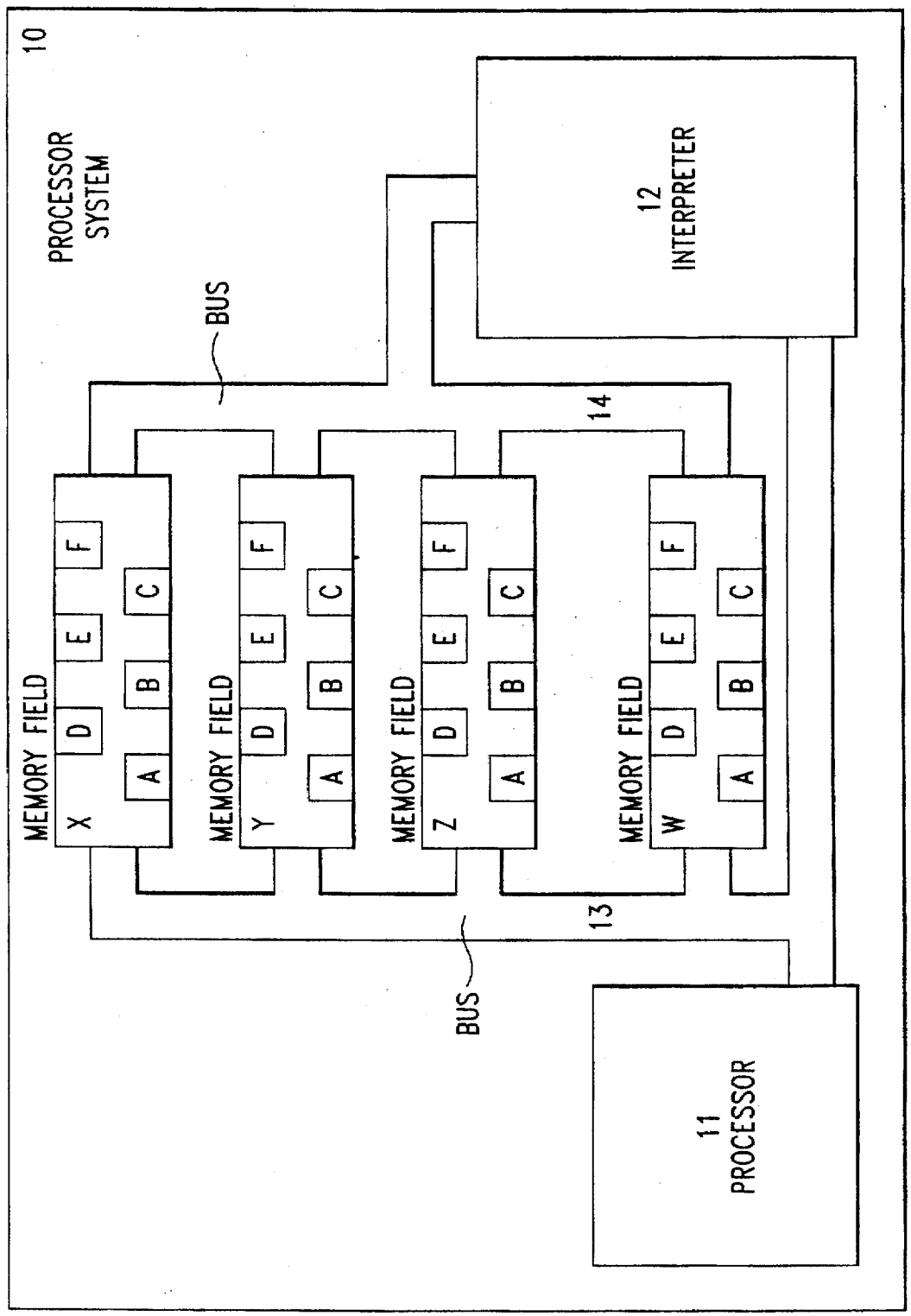
FIG. 1 shows a processor system according to the invention comprising four memory fields for containing computer interfaces.

In FIG. 1 processor system 10 comprises a processor 11, an interpreter 12, four memory fields X, Y, Z and W. Via a bus 13 processor 11 is connected with interpreter 12 and with the memory fields X, Y, Z and W, and via a bus 14 memory fields X, Y, Z and W are connected with interpreter 12. A memory field X, Y, Z or W contains a computer interface having according to this embodiment six elements A, B, C, D, E and F, each one of these elements representing a different function. At least one of them can be displayed directly on a screen, for example an icon which is activated by a mouse. Other elements can only be displayed indirectly, for example via a menu-item on a menubar via which these elements are to be selected using a mouse. Of course, the terms "directly" and "indirectly" are equivalent to respectively "indirectly" and "twice indirectly", or "twice indirectly" and "three times indirectly", etc.

Figure 2:
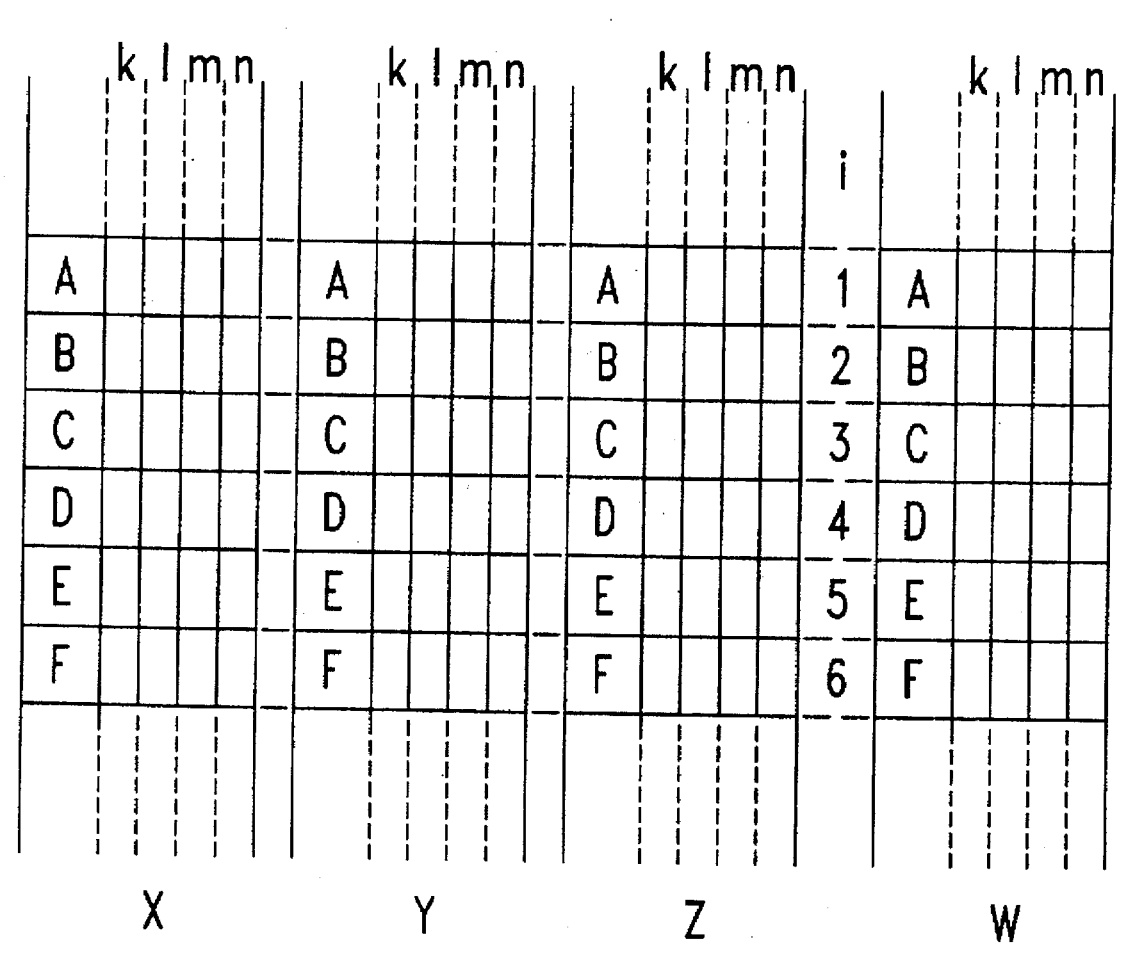

In FIG. 2 four memory fields X, Y, Z and W are represented. To adapt a computer interface, there are several possibilities:

the content of a memory field X, Y, Z or W remains in the same memory field while adapting;

the content of a memory field X, Y or Z is placed into the memory field W for the adapting;

the content of a memory field X, Y, Z or W is placed into another memory not shown in FIG. 1, for example a processor memory, for the adapting. A computer interface comprises according to this embodiment six elements A (row i=1), B (row i=2), C (row i=3), D (row i=4), E (row i=5) and F (row i=6), and to each element A, B, C, D, E or F an element code (column k) and three element parameters (columns 1, m and n) are allocated. An element code $X_{i,k}$, $Y_{i,k}$, $Z_{i,k}$ and $W_{i,k}$ represents this element being enabled or disabled, and an element parameter $X_{i,l}$, $Y_{i,l}$, $Z_{i,l}$ and $W_{i,l}$ represents this element being displayed directly or indirectly. An element parameter $X_{i,m}$, $Y_{i,m}$, $Z_{i,m}$ and $W_{i,m}$ represents a number of times for example per time interval this element has been activated, and an element parameter $X_{i,n}$, $Y_{i,n}$, $Z_{i,n}$ and $W_{i,n}$ represents a previous number of times for example per time interval this element has been activated. Of course, further element codes and element parameters are possible.

Figure 3:
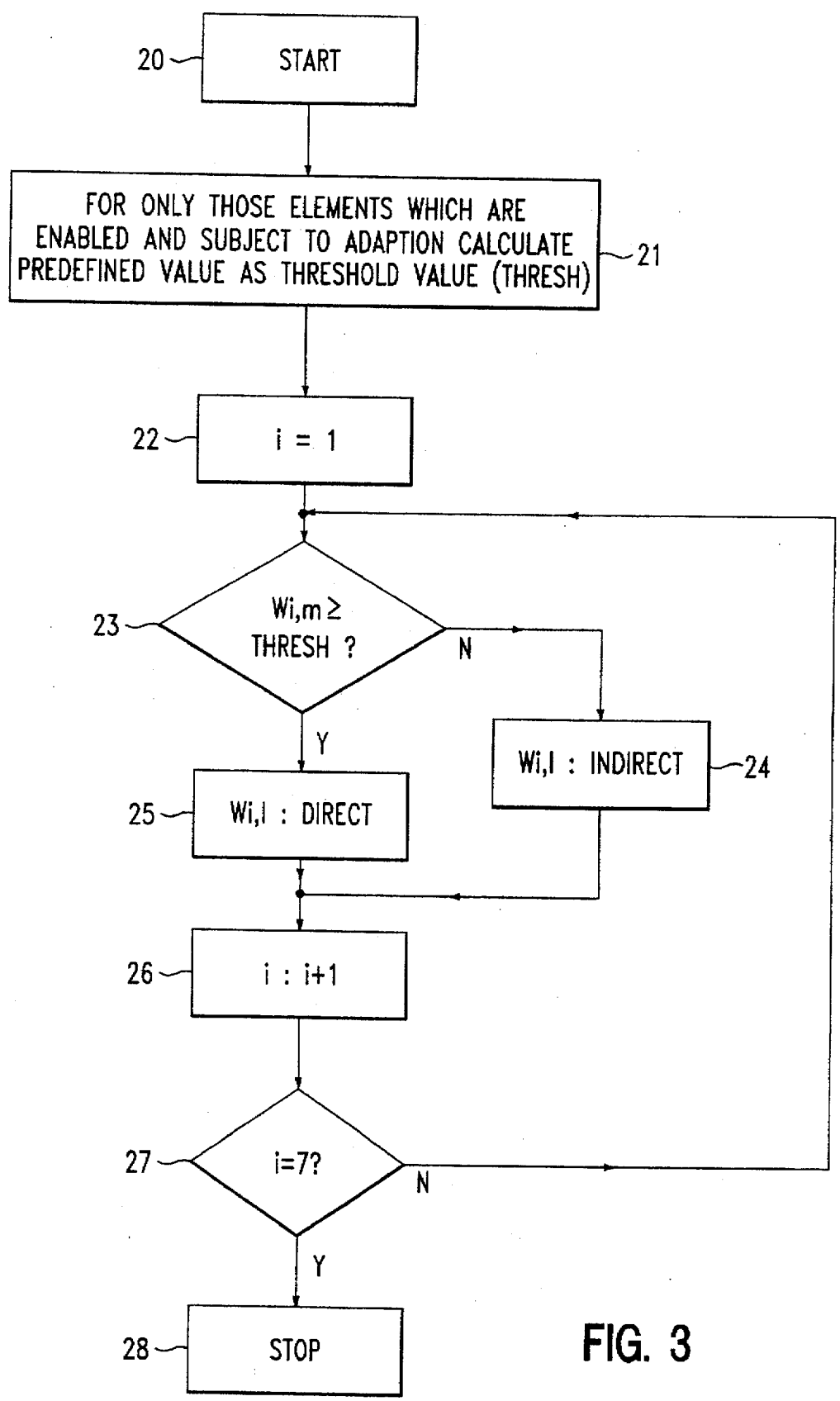
FIG. 3 shows a flow chart of adapting the adaptable computer interface in the adaptable memory field.

In FIG. 3 blocks of the flow chart have the following meaning: block meaning

| block | meaning |
| --- | --- |
| 20 | start |
| 21 | calculate predefined value as threshold value for only those elements which are enabled and subject to adaptation |
| 22 | i:=1 |

-continued

| block | meaning |
| --- | --- |
| 23 | $W_{i,m} \geq$ threshold value ? <br> if yes: to block 25 <br> if no: to block 24 |
| 24 | $W_{i,l}$:=Indirect |
| 25 | $W_{i,l}$:=Direct |
| 26 | i:=i + 1 |
| 27 | i = 7? <br> if yes : to block 28 <br> if no : to block 23 |
| 28 | stop |

According to the flow chart of FIG. 3, after the adapting has started (block 20), a predefined value further to be called threshold value is calculated (block 21), but only for those elements which are enabled and subject to adaptation. There are several possibilities to do this, for example:

comparing the number of times an enabled element has been activated with the number of times another enabled element has been activated for each possible combination of enabled elements, and at the hand of the comparison results selecting a certain borderline as a threshold;

calculating an average of several previous numbers of times enabled elements have been activated and selecting the average as a threshold;

adding an element-dependent number to a previous number of times an enabled element has been activated and selecting the sum as an element-dependent threshold;

calculating an average of a present and one or more previous thresholds.

Then i gets the value 1 (block 22) and the number of times an element has been activated $W_{i,m}$ is compared with the calculated threshold (block 23), which causes this element to be displayed directly (block 25) or indirectly (block 24). Subsequently, i is increased by the value 1 (block 26) and the next number of times an element has been activated is compared with the calculated threshold (block 23 etc.) until i gets the value 7 (block 27). Of all six elements $W_{i,l}$ has been determined, and the adapting stops (block 28).

While some thresholds, like the one being a selected borderline, will lead to a number of elements to be displayed directly being equal to a maximum number of elements that can be displayed directly, other thresholds, like the one being a sum of an element-dependent number and a previous number, could lead to a larger or smaller number than the maximum number. In case of a larger number, a next selection should be made to decrease the larger number, for example at the hand of a new borderline which is defined for elements belonging to the larger number only. In case of a smaller number, this may be increased, for example at the hand of a new borderline which is defined for only those elements not belonging to the smaller number.

Figure 4:
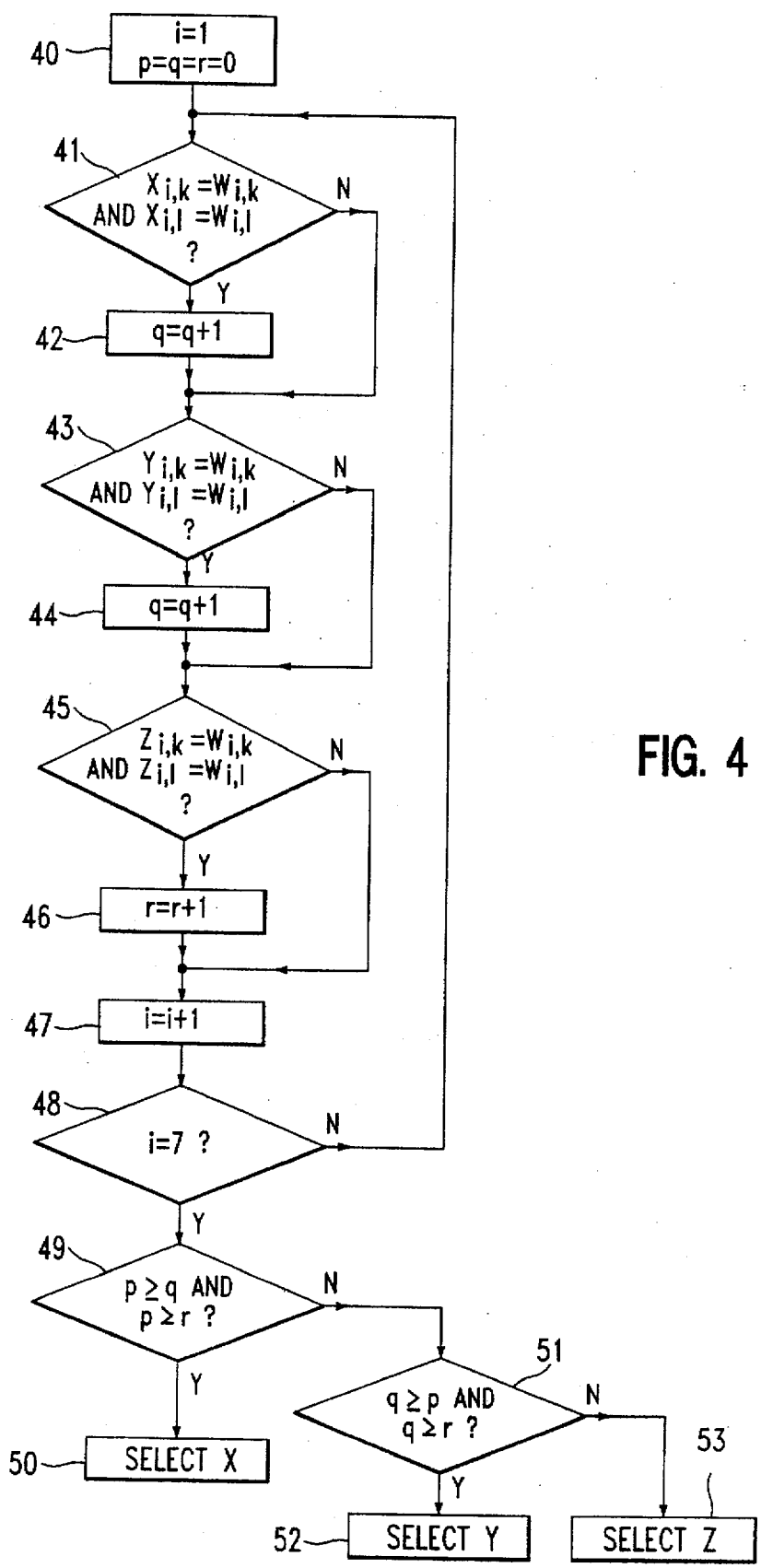
FIG. 4 shows a flow chart of selecting one of the three memory fields that shows most resemblance to a fourth memory field.

In FIG. 4 blocks of the flow chart have the following meaning:

| block | meaning |
| --- | --- |
| 40 | i = 1 , p = q = r = 0 |
| 41 | $X_{i,k} = W_{i,k}$ and $X_{i,l} = W_{i,l}$ ? <br> if yes : to block 42 <br> if no: to block 43 |
| 42 | p := p + 1 |

-continued

| block | meaning |
|---|---|
| 43 | $Y_{i,k} = W_{i,k}$ and $Y_{i,l} = W_{i,l}$ ?<br>if yes : to block 44<br>if no : to block 45 |
| 44 | $q := q + 1$ |
| 45 | $Z_{i,k} = W_{i,k}$ and $Z_{i,l} = W_{i,l}$ ?<br>if yes : to block 44<br>if no : to block 45 |
| 46 | $r := r + 1$ |
| 47 | $i := i + 1$ |
| 48 | $i = 7$ ?<br>if yes : to block 49<br>if no : to block 41 |
| 49 | $p \geq q$ and $r$ ?<br>if yes : to block 50<br>if no : to block 51 |
| 50 | select memory field X |
| 51 | $q \geq p$ and $r$?<br>if yes : to block 52<br>if no : to block 53 |
| 52 | select memory field Y |
| 53 | select memory field Z |

According to the flow chart of FIG. 4, i gets the value 1 and p, q and r get the value 0 (block 40). For i having the value 1 to 6 (block 47, 48), $X_{i,k}$ is compared with $W_{i,k}$ and $X_{i,l}$ is compared with $W_{i,l}$ (block 41) and in case of equality p is increased by the value 1 (block 42), $Y_{i,k}$ is compared with $W_{i,k}$ and $Y_{y,l}$ is compared with $W_{i,l}$ (block 43) and in case of equality q is increased by the value 1 (block 44), $Z_{i,k}$ is compared with $W_{i,k}$ and $Z_{i,l}$ is compared with $W_{i,l}$ (block 45) and in case of equality r is increased by the value 1 (block 46). Then p is compared with q and r respectively (block 49) and if $p \geq q$, r then memory field X (block 50) is selected. Otherwise q is compared with p and r respectively (block 51) and if $q \geq p$, r then memory field Y (block 52) is selected. Otherwise memory field Z (block 53) is selected.

At the hand of the flow chart of FIG. 4, one memory field is selected out of three memory fields (X, Y, Z) which shows most resemblance to another memory field (W). This is done by comparing for each element an element code ($X_{i,k}$, $Y_{i,k}$, $Z_{i,k}$: enabled/disabled) with an element code of the other memory ($W_{i,k}$: enabled/disabled) as well as comparing for each element an element parameter ($X_{i,l}$, $Y_{i,l}$, $Z_{i,l}$: directly/indirectly) with an element parameter of the other memory ($W_{i,l}$: directly/indirectly). Of course, many alternatives are possible, like comparing element codes only, or parameter codes only (possibly the number of times elements have been activated, and/or previous numbers of times they have been activated), and/or using different values for increasing p, q and r. For example, if $X_{i,k}$ is equal to $W_{i,k}$ and $X_{i,l}$ is equal to $W_{i,l}$ then p is increased with the value 3, if $X_{i,k}$ is equal to $W_{i,k}$ and $X_{i,l}$ is not equal to $W_{i,l}$ then p is increased with the value 2 and if $X_{i,k}$ is not equal to $W_{i,k}$ and $X_{i,l}$ is equal to $W_{i,l}$ then p is increased with the value 1. In this case, resemblance between element codes is more important than resemblance between parameter codes, and resemblance between element codes and between parameter codes is most important.

Figure 5A:
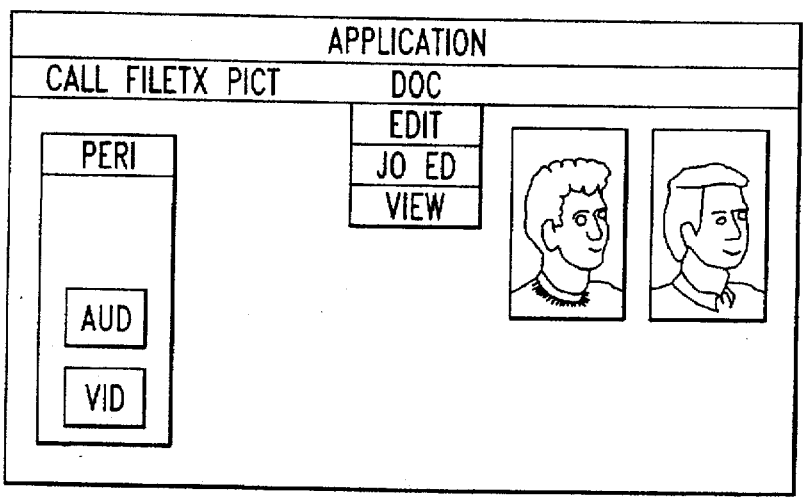
FIG. 5 shows three possible screen layouts in FIGS. 5a, 5b and 5c for a processor system according to the invention.

The screen layout of a conference application in FIG. 5a shows a directly displayed element "window" containing a direct displayed element "menubar" comprising elements "menu-items" like CALL (set up connection), FILETX (select 8c transmit file), PICT (select, view & transmit selected picture) and DOC (local & joint editing 8r view without editing), which all are also displayed directly. Further an element "window" PERI (select peripheral) is shown comprising a directly displayed element "icon" AUD (select audio) and a directly displayed element "icon" VID (select video). The element "menu-item" DOC has been activated, and its pull down menu is shown comprising "pull-down-menu-items" EDIT (local editing selected document), JO ED (joint editing selected document) and VIEW (view selected document). Since the elements "pull-down-menu-item" are displayed only after activation of element "menu-item" DOC, these elements are displayed indirectly. The other elements "menu-item" CALL, FILETX and PICT are not activated, but could also be activated. The elements "icon" AUD and VID are not activated, but could be activated. If for example the element "icon" AUD would have been activated, as a result an element "window" AUDIO would have been shown comprising elements "icon" loudspeaker, AUD MU (audio muting) and QU (quit for closing element "window" AUDIO). Since the element "Window" AUDIO will be displayed only after activation of the element "icon" AUD, the element "window" AUDIO (and its elements "icon") is displayed indirectly. Two further elements "video window" showing other conferees are also directly displayed in this screen layout.

Figure 5B:
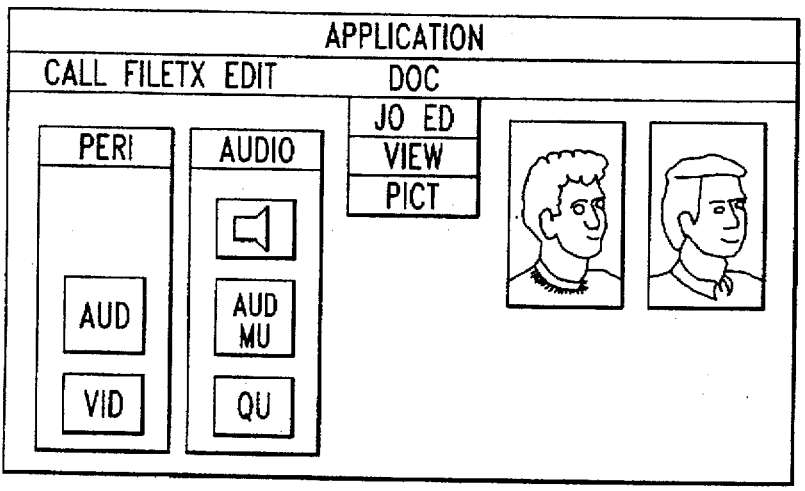

The screen layout of a conference application in FIG. 5b shows a directly displayed element "window" containing a directly displayed element "menubar" comprising elements "menu-items" like CALL (set up connection), FILETX (select & transmit file), EDIT (local editing) and DOC (joint editing & view selected document & select, view and transmit selected picture), which all are also displayed directly. Further an element "window" PERI (select peripheral) is shown comprising a directly displayed element 'icon" AUD (select audio) and a directly displayed element "icon" VID (select video). Element "menu-item" DOC has been activated, and its pull down menu is shown comprising "pull-down-menu-items" JO ED (joint editing selected document), VIEW (view selected document) and PICT (select, view & transmit selected picture). Since the elements "pull-down-menu-item" are displayed only after activation of the element "menu-item" DOC, these elements are displayed indirectly. The other elements "menu-item" CALL, FILETX and EDIT are not activated, but could also be activated. The element "icon" AUD has been activated, and as a result an element "window" AUDIO is shown comprising elements "icon" loudspeaker, AUD MU (audio muting) and QU (quit for closing element "window" AUDIO). Since the element "window" AUDIO is displayed only after activation of the element "icon" AUD, the element "window" AUDIO (and its elements "icon") is displayed indirectly. Two further elements "video window" showing other conferees are also directly displayed in this screen layout.

Figure 5C:
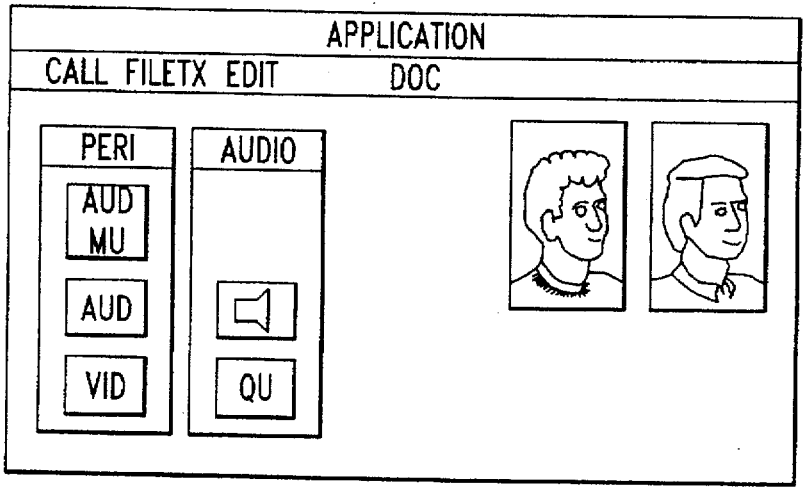

The screen layout of a conference application in FIG. 5c shows a directly displayed element window" containing a directly displayed element "menubar" comprising elements "menu-items" like CALL (set up connection), FILETX (select & transmit file), EDIT (local editing) and DOC (joint editing & view selected document & select, view and transmit selected picture), which all are also displayed directly. Further an element "window" PERI (select peripheral) is shown comprising a directly displayed element "icon" AUD (select audio), a directly displayed element "icon" VID (select video) and a directly displayed element "icon" AUD MU (audio muting). The element "icon" AUD has been activated, and as a result an element "window" AUDIO is shown comprising elements "icon" loudspeaker and QU (quit for closing element "window" AUDIO). Since the element "window" AUDIO is displayed only after activation of the element "icon" AUD, the element "window" AUDIO (and its elements "icon") is displayed indirectly. Two further elements "video window" showing other conferees are also directly displayed in this screen layout.

In the screen layouts of FIGS. 5a and 5b the element "menu-item" DOC has been activated, and its pull down menu is shown comprising indirectly displayed "pull-down-menu-items" JO ED and VIEW and in FIG. 5a EDIT (which is a directly displayed element "menu-item" in FIG. 5b) and in FIG. 5b PICT (which is a directly displayed element "menu-item" in FIG. 5a). Such a change could be the result of an adaptation as described in FIGS. 1, 2, 3 and 4, due to the fact that according to the screen layout in FIG. 5a the element PICT has been activated more frequently than the element EDIT, while according to the screen layout in FIG. 5b the element EDIT has been activated more frequently than the element PICT. The screen layout of FIG. 5a has been transformed into the screen layout of FIG. 5b, xbecause of the element "pull-down-menu-item" EDIT has been more frequently used than the element "menu-item" PICT in FIG. 5a. Further, according to the screen layout in FIG. 5a the element "icon" AUD has not been activated, while according to the screen layout in FIG. 5b the element "icon" AUD has been activated, resulting in the element "window" AUDIO.

In the screen layouts of FIGS. 5b and 5c the element "icon" AUD has been activated, resulting in the element "window" AUDIO. However, according to the screen layout of FIG. 5b the element "window" AUDIO comprises the elements "icon' AUD and VID, while according to the screen layout of FIG. 5c the element "window" AUDIO further comprises the element "icon" AUD MU. Such a change could be the result of an adaptation as described in FIGS. 1, 2, 3 and 4, due to the fact that according to the screen layout in FIG. 5b the element AUD MU has not been activated more frequently than a certain threshold, while according to the screen layout in FIG. 5c the element AUD MU has been activated more frequently than the threshold. As a result of the invention the layout of element "window" PERI in FIG. 5b has been modified into the layout of element "window" PERI in FIG. 5c due to the fact that element "icon" AUD MU has been activated more frequently than a given threshold. Further, according to the screen layout in FIG. 5b the element "menu-item" DOC has been activated, resulting in the elements "pull-down-menu-item", while according to the screen layout in FIG. 5c the element "menu-item" DOC has not been activated.

According to FIG. 2 and FIG. 5a, the element codes and element parameters allocated to the elements could be as follows:

| element | k | l | m | n |
| --- | --- | --- | --- | --- |
| menubar | E | D | — | — |
| CALL | E | D | 7 | 8 |
| FILETX | E | D | 6 | 9 |
| PICT | E | D | 4 | 5 |
| DOC | E | D | 4 | 6 |
| EDIT | E | I | 3 | 4 |
| JO ED | E | I | 2 | 2 |
| VIEW | E | I | 1 | 2 |
| PERI | E | D | — | — |
| AUD | E | D | 6 | 3 |
| VID | E | D | S | 4 |
| AUD MU | E | I | 2 | 3 |
| loudspeaker | E | I | 1 | 1 |
| QU | E | I | — | — |
| number of required video windows | E | D | — | — |

According to this table all elements are enabled (column k), which means that they are displayed either directly or indirectly (column l). Further, the number of times (column m) they have been activated, for example during an hour, and the previous number of times (column n) they have been activated, for example during a previous hour, is shown, except for the elements menubar and PERI, which are always shown directly. The element menubar, PERI, QU and number of required video windows are not subject to adaptation and are to be excluded from a calculation according to FIG. 3. An extra column could be added to the table to indicate which elements are excluded from adaptation.

As can be derived from column m, the directly displayed element "menu-item" PICT (E,D,4,5) has been activated 4 times per time interval and the indirectly displayed element "pull-down-menu-item" EDIT (E,I,3,4) has been activated 3 times per time interval. If during a next time interval the element PICT is activated 4 times and the element EDIT is activated S times, then the element PICT will be displayed indirectly (as a pull-down-menu-item element: E,I,4,4) and the element EDIT will be displayed directly (as a menu-item element: E,D,5,3). A new table (not shown) in which this amendment is done corresponds to FIG. 2 and FIG. 5b.

As can be derived from column m, the indirectly displayed element "icon" AUD MU (E,I,2,3) has been activated 2 times per time interval, which number of times is smaller than a certain threshold, for example 4 times per time interval. If during a next time interval the element AUD MU is activated 5 times, which number of times is larger than the certain threshold of 4 times per time interval, then the element AUD MU will be displayed directly (as a direcltly displayed element "icon": E,D,5,2). Another new table (not shown) in which this amendment is done corresponds to FIG. 2 and FIG. 5c.

Of course, measures should be taken to allocate an element type ("menubar", "menu -item", "pull-down-menu -item", "window", "icon" etc.) to each element. This could be realised by allocating a certain element type to each row of the shown table, in which case sometimes it will be necessary to interchange some elements or element types after adaptation. It could also be realized by adding an extra column to the shown table for indicating the element type.

Further it is observed that element codes and element parameters allocated to an element could be made adjustable, for example in a user-dependent way.

We claim:

1. A processor system comprising a processor and a memory field for containing a computer interface having a number of elements each representing a function, an element being directly displayed on a screen in case this element is entirely displayed all the time and independent of whether or not this element has been activated, and an element being selectively displayable on the screen in case this element is not entirely displayed all the time but is only entirely displayed after this element has been activated, the processor system being adapted for displaying at least one element directly on a screen, the processor system being adapted for
   allocating a first element parameter to a first element, the first element parameter being a function of a number of times this first element has been activated, allocating an element type to the first element, allocating a second element parameter to a second element, the second element parameter being a function of a number of times this second element has been activated, allocating an element type to the second element, comparing the first element parameter with a threshold value and based on a comparison result either directly displaying the first element on the screen or enabling the first element for selective display on the screen, comparing the second element parameter with another threshold value and based on another comparison result either directly displaying the second element on the screen or enabling the second element for selective display on the screen, and based on the comparison results either interchanging values of at least two element types or not interchanging values of said at least two element types, the memory field and the computer interface being adaptable by storing new values of element parameters and of element types.

2. The processor according to claim 1 wherein an element type corresponds to a location in the memory of an element parameter.

3. The processor system according to claim 1 wherein, in the memory field, storage locations are represented by rows and columns, and wherein elements are located at rows and element parameters and element types are located at columns.

4. The processor system according to claim 1 wherein, in the memory field, storage locations are represented by rows and columns, and wherein elements are located at columns and element parameters and element types are located at rows.

5. The processor system according to claim 1, wherein the processor system is adapted for determining a total number of element types each having the same value, comparing this total number with yet another threshold value and based on yet another comparison result and on said comparison results either allocating said same value to another element type or interchanging said same value of one of the total number of element types and another value of said another element type.

6. The processor according to claim 5 wherein an element type corresponds to a location in the memory of an element parameter.

7. The processor system according to claim 5 wherein, in the memory field, storage locations are represented by rows and columns, and wherein elements are located at rows and element parameters and element types are located at columns.

8. The processor system according to claim 5 wherein, in the memory field, storage locations are represented by rows and columns, and wherein elements are located at columns and element parameters and element types are located at rows.

* * * * *